(12) United States Patent
Hattori

(10) Patent No.: US 10,754,151 B2
(45) Date of Patent: Aug. 25, 2020

(54) CONTENT DISPLAY APPARATUS AND NON-TRANSITORY COMPUTER READABLE MEDIUM

(71) Applicant: FUJI XEROX CO., LTD., Tokyo (JP)

(72) Inventor: Keigo Hattori, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 55 days.

(21) Appl. No.: 15/672,824

(22) Filed: Aug. 9, 2017

(65) Prior Publication Data

US 2018/0284433 A1    Oct. 4, 2018

(30) Foreign Application Priority Data

Mar. 29, 2017  (JP) ................. 2017-065160

(51) Int. Cl.
*G02B 27/01* (2006.01)
*G06K 9/00* (2006.01)
*G06K 9/76* (2006.01)
*G06K 9/22* (2006.01)
*G06K 9/20* (2006.01)

(52) U.S. Cl.
CPC ....... *G02B 27/0101* (2013.01); *G02B 27/017* (2013.01); *G06K 9/0004* (2013.01); *G06K 9/00671* (2013.01); *G06K 9/2054* (2013.01); *G06K 9/222* (2013.01); *G06K 9/76* (2013.01); *G02B 2027/0138* (2013.01)

(58) Field of Classification Search
CPC ...... H04N 5/232; H04N 1/0044; G06K 9/228; G09B 5/06; G06F 1/1616; G06F 3/0483; G06F 3/0484; G06F 3/0485; G07B 17/00024
See application file for complete search history.

(56) References Cited

U.S. PATENT DOCUMENTS 6,337,698 B1 * 1/2002 Keely, Jr. .............. G06F 3/0483
715/777
8,505,978 B1 * 8/2013 Leon ................ G07B 17/00024
281/51

(Continued)

FOREIGN PATENT DOCUMENTS

JP    2005-267257 A    9/2005
JP    2009-026123 A    2/2009
JP    2015-204035 A    11/2015

*Primary Examiner* — Toan H Vu
(74) *Attorney, Agent, or Firm* — Sughrue Mion, PLLC

(57) ABSTRACT

A content display apparatus includes the following elements. An image acquiring unit acquires images. A memory stores content to be superimposed on an image of a sheet medium among the acquired images. A content display unit displays the content so as to be superimposed on the image of the sheet medium, in accordance with the image of the sheet medium. An input member has a shape of a writing tool, is held by a user for use, and includes a light-emitting portion at a tip thereof. A light determining unit determines a position illuminated with light emitted from the light-emitting portion, based on the images acquired by the image acquiring unit. A storing unit stores, based on a path of the light determined while the input member is in contact with the sheet medium, the path in association with the content.

14 Claims, 11 Drawing Sheets

(56) References Cited

U.S. PATENT DOCUMENTS

| | | | |
|---|---|---|---|
| 2002/0092517 A1* | 7/2002 | Jelten | A61F 7/02 126/263.01 |
| 2009/0000830 A1* | 1/2009 | Kim | G06F 1/1616 178/18.03 |
| 2013/0139101 A1* | 5/2013 | Lira | G06F 3/0485 715/784 |
| 2013/0183651 A1* | 7/2013 | Takahashi | G09B 5/06 434/350 |
| 2014/0123018 A1* | 5/2014 | Park | G06F 3/0484 715/738 |
| 2014/0152843 A1* | 6/2014 | Sakurai | H04N 5/232 348/169 |
| 2014/0310631 A1* | 10/2014 | Harrison | G06F 3/0484 715/771 |
| 2014/0325410 A1* | 10/2014 | Jung | G06F 3/0488 715/765 |
| 2015/0049031 A1* | 2/2015 | Maruoka | G06F 3/03545 345/173 |
| 2015/0058789 A1* | 2/2015 | Namgung | G06F 3/0488 715/781 |
| 2015/0138595 A1* | 5/2015 | Sugimoto | H04N 1/0044 358/1.15 |
| 2017/0068869 A1* | 3/2017 | Tomisawa | G06K 9/228 |
| 2017/0131865 A1* | 5/2017 | Kim | G06F 3/04812 |

* cited by examiner

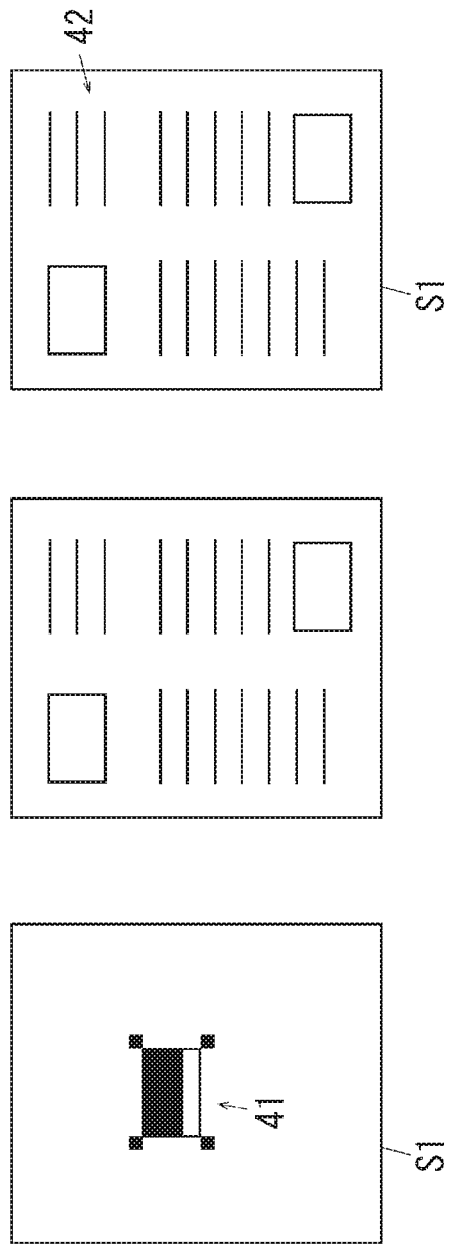

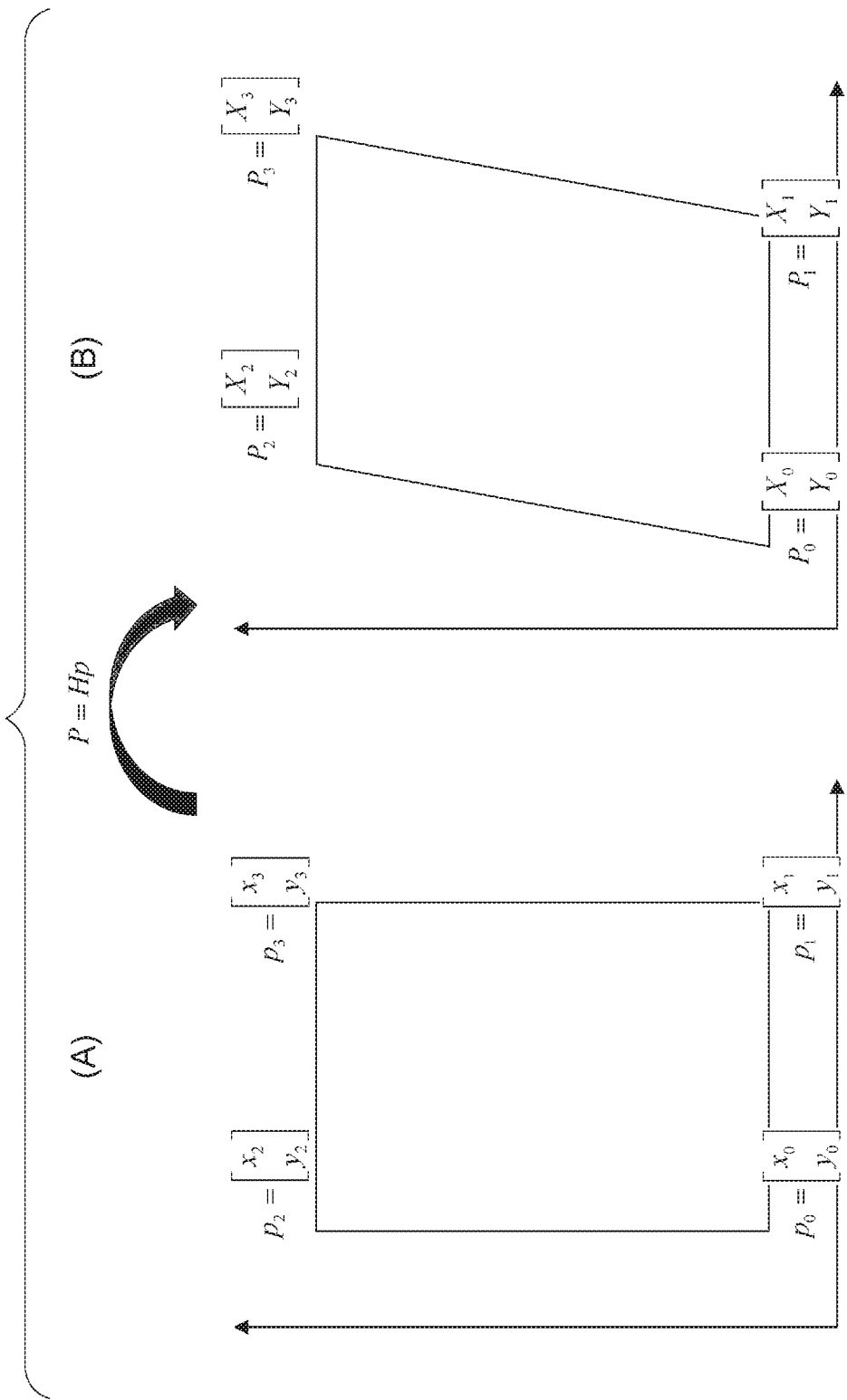

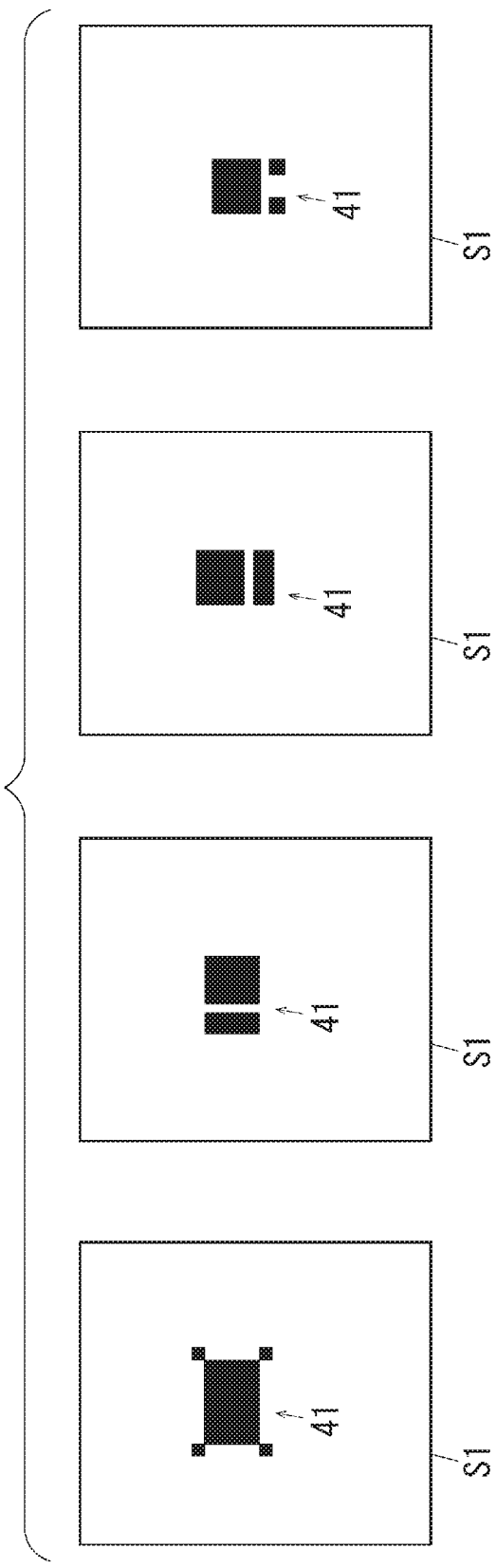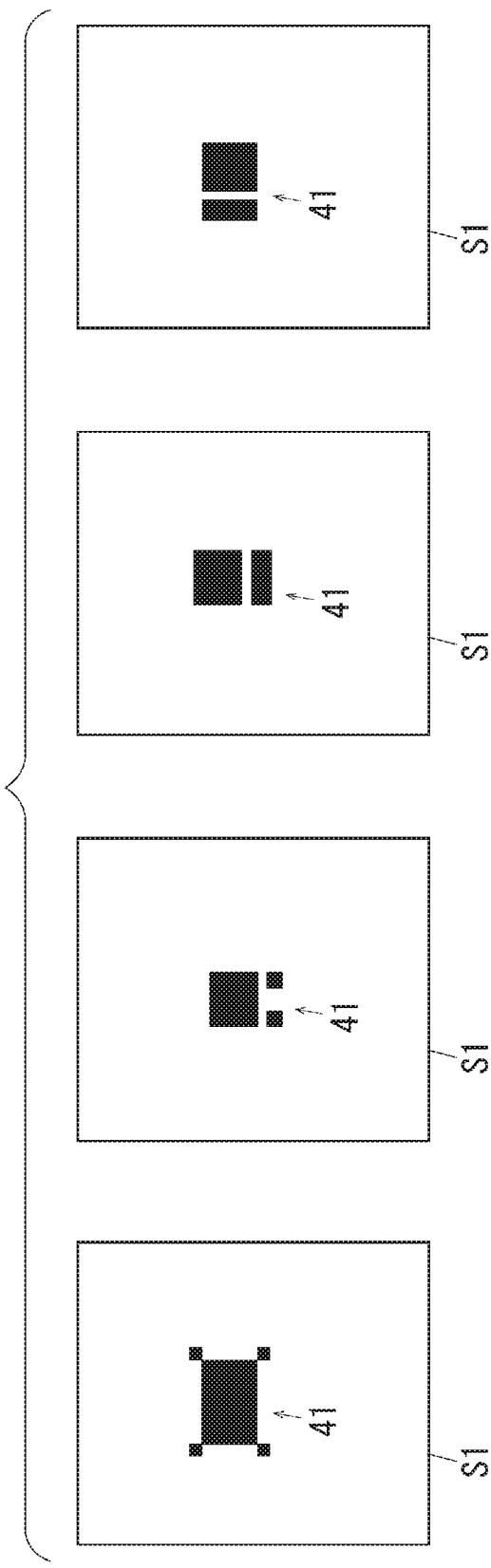

CONTENT DISPLAY APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-065160 filed Mar. 29, 2017.

BACKGROUND

(i) Technical Field

The present invention relates to a content display apparatus and a non-transitory computer readable medium.

(ii) Related Art

There are techniques for capturing text, symbols, underlines, and the like handwritten by a user into information processing apparatuses such as computers.

SUMMARY

According to an aspect of the invention, there is provided a content display apparatus including an image acquiring unit, a memory, a content display unit, an input member, a light determining unit, and a storing unit. The image acquiring unit acquires images. The memory stores content to be superimposed on an image of a sheet medium among the images acquired by the image acquiring unit. The content display unit displays the content so as to be superimposed on the image of the sheet medium, in accordance with the image of the sheet medium acquired by the image acquiring unit. The input member has a shape of a writing tool and is held by a user for use. The input member includes a light-emitting portion at a tip thereof. The light determining unit determines a position illuminated with light emitted from the light-emitting portion, based on the images acquired by the image acquiring unit. The storing unit stores, based on a path of the light determined while the input member is in contact with the sheet medium, the path in association with the content.

BRIEF DESCRIPTION OF THE DRAWINGS

An exemplary embodiment of the present invention will be described in detail based on the following figures, wherein:

FIG. 5A illustrates a state before a sheet is turned over, FIG. 5B illustrates a state where the sheet is being turned over, and FIG. 5C illustrates a state after the sheet has been turned over;

FIGS. 6A to 6C illustrate how content is superimposed in accordance with the exemplary embodiment, specifically, FIG. 6A illustrates a sheet having an identification mark thereon, FIG. 6B illustrates content data associated with the identification mark illustrated in FIG. 6A, and FIG. 6C illustrates a state where the content data is superimposed on the sheet;

FIG. 7A illustrates a state before the division and FIG. 7B illustrates a state after the division;

Figure 9:
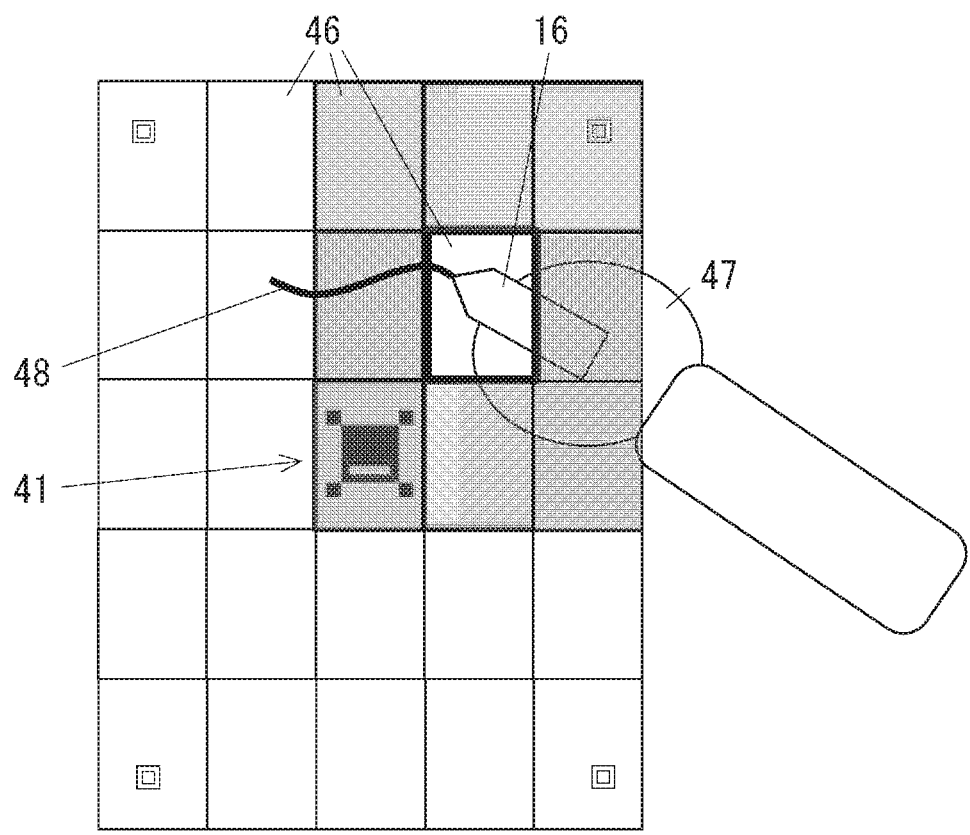
Figure 10:
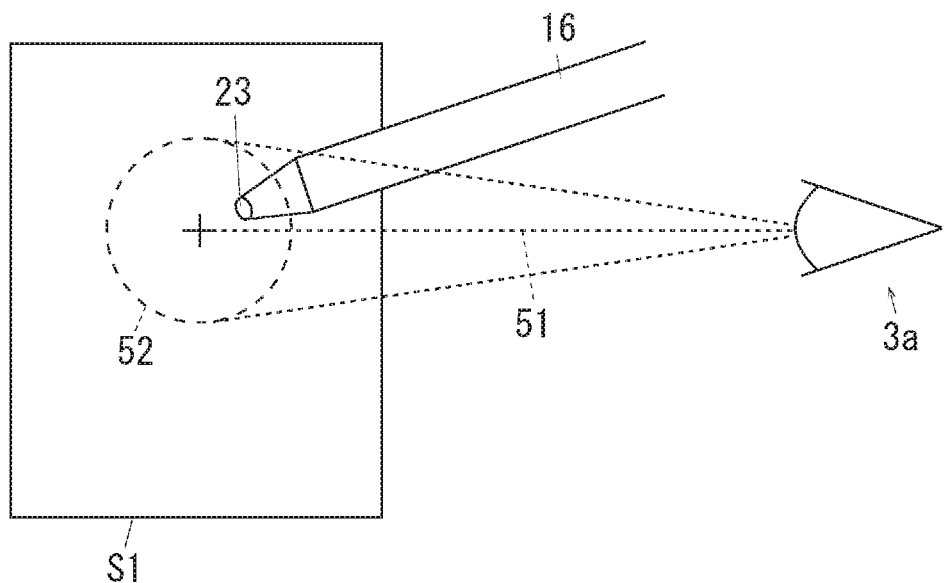
Figure 11A:
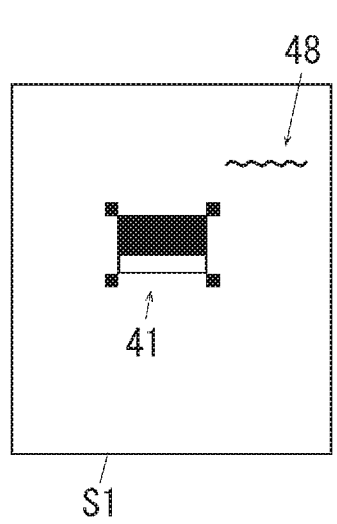
Figure 11B:
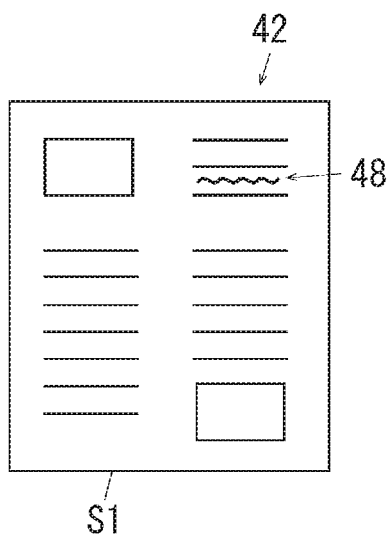
Figure 12:
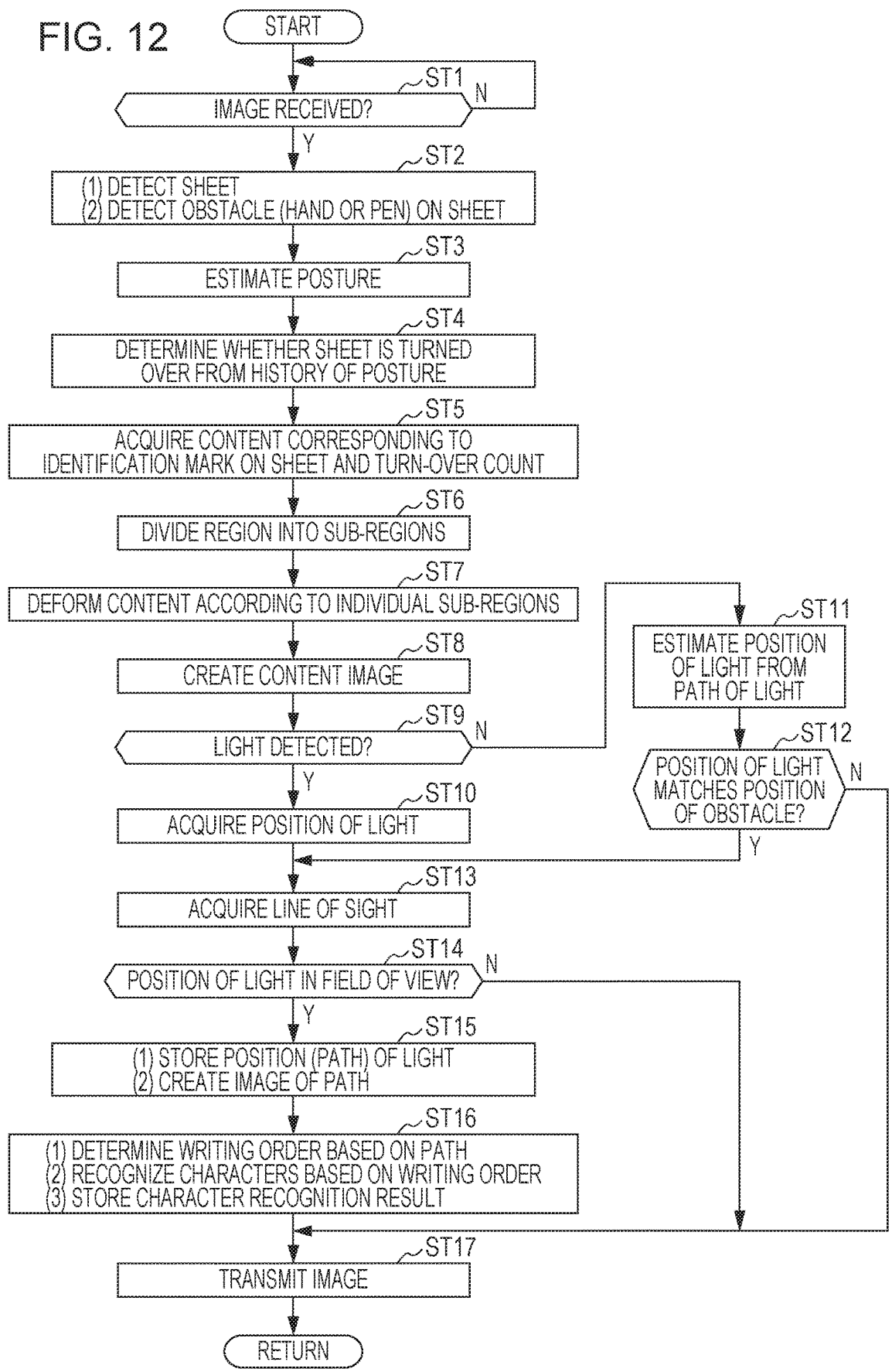

Part (A) and part (B) of FIG. 8 illustrate how content is deformed in accordance with the exemplary embodiment, specifically, part (A) of FIG. 8 illustrates a state before the deformation and part (B) of FIG. 8 illustrates a state after the deformation;

FIG. 9 illustrates an example of a position identification method used in the case where the position is hidden by an obstacle;

FIG. 10 illustrates a line of sight and a field of view in accordance with the exemplary embodiment;

FIGS. 11A and 11B illustrate an example in which writing is performed on a content image, specifically, FIG. 11A illustrates a sheet and a light path and FIG. 11B illustrates data to be displayed and stored;

FIG. 12 is a flowchart of a display image creation process according to the exemplary embodiment; and FIGS. 13A and 13B illustrate a state where plural sheets are arranged, specifically, FIG. 13A illustrates a state before rearrangement and FIG. 13B illustrates a state after the rearrangement.

DETAILED DESCRIPTION

An exemplary embodiment, which is a specific example of embodiments of the present invention, will be described with reference to the accompanying drawings. Note that the present invention is not limited to the exemplary embodiment below.

Illustration of members other than those used in the following description that is given with reference to the accompanying drawings is appropriately omitted for ease of understanding.

Exemplary Embodiment

Figure 1:
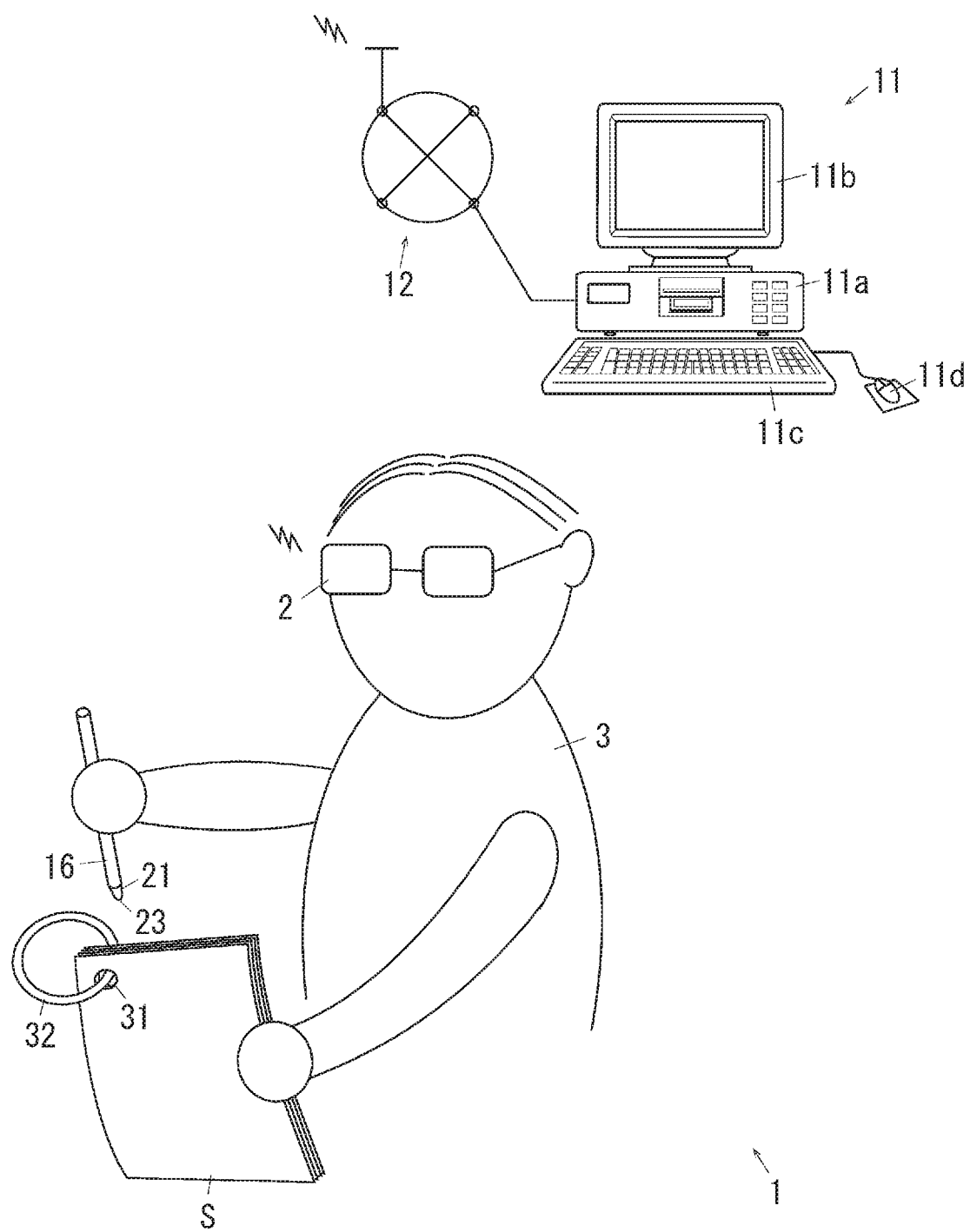
FIG. 1 illustrates a content display system including a content display device according to an exemplary embodiment of the present invention.

FIG. 1 illustrates a content display system including a content display device according to an exemplary embodiment of the present invention.

Figure 2:
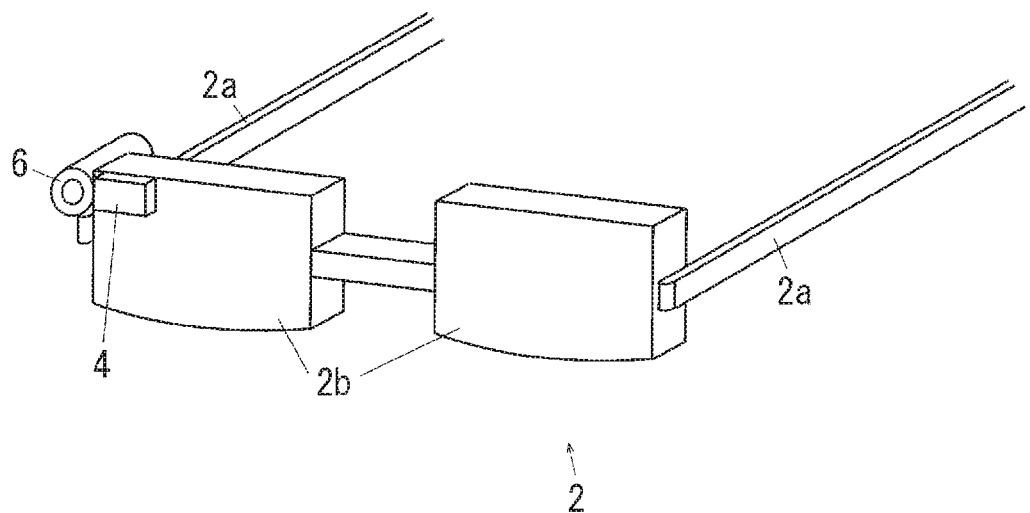
FIG. 2 illustrates a head-mounted display, which is an example of the content display device according to the exemplary embodiment of the present invention.

FIG. 2 illustrates a head-mounted display, which is an example of the content display device according to the exemplary embodiment.

Referring to FIG. 1, a content display system 1 according to the exemplary embodiment of the present invention includes a head-mounted display 2, which is an example of the content display device. Referring to FIGS. 1 and 2, the head-mounted display 2 according to the exemplary embodiment has an eyeglass shape so as to be worn by a user 3. The head-mounted display 2 includes a frame portion 2a, which is an example of a frame portion; and a glass portion 2b, which is an example of a display screen supported by the frame portion 2a. The frame portion 2a supports a projector 4, which is an example of a display member. The projector 4 projects an image or a video image onto the glass portion 2b so as to allow the user to view the projected image or video image. That is, the head-mounted display 2 is configured such that the user 3 is able to view scenery or an object located ahead through the glass portion 2b and view the image projected onto the glass portion 2b.

The frame portion 2a of the head-mounted display 2 supports a camera 6, which is an example of an image acquisition member. The orientation of the camera 6 is set so that the camera 6 successfully captures an image or video image of scenery located ahead of the user 3.

In addition, the head-mounted display 2 supports a line-of-sight detecting member (not illustrated). Any given line-of-sight detecting member of the related art, such as a member that detects the line of sight of the user 3 by capturing an image of positions of the dark parts of the user's eyes with a camera and analyzing the image, a member that detects the line of sight by irradiating eyeballs of the user 3 with infrared and detecting the positions of the dark parts, or a member that detects the line of sight on the basis of eye potentials, may be employed as the line-of-side detecting member.

Further, the head-mounted display 2 according to the exemplary embodiment includes therein a wireless communication module (not illustrated). That is, the head-mounted display 2 is capable of transmitting and receiving information to and from a server 11, which is an example of an information processing apparatus, by wireless communication.

The server 11 includes a server body 11a; a display 11b, which is an example of a display member; and a keyboard 11c and a mouse 11d, which are examples of input members. In addition, the server 11 is capable of transmitting and receiving information to and from the head-mounted display 2 via a communication network 12.

Figure 3:
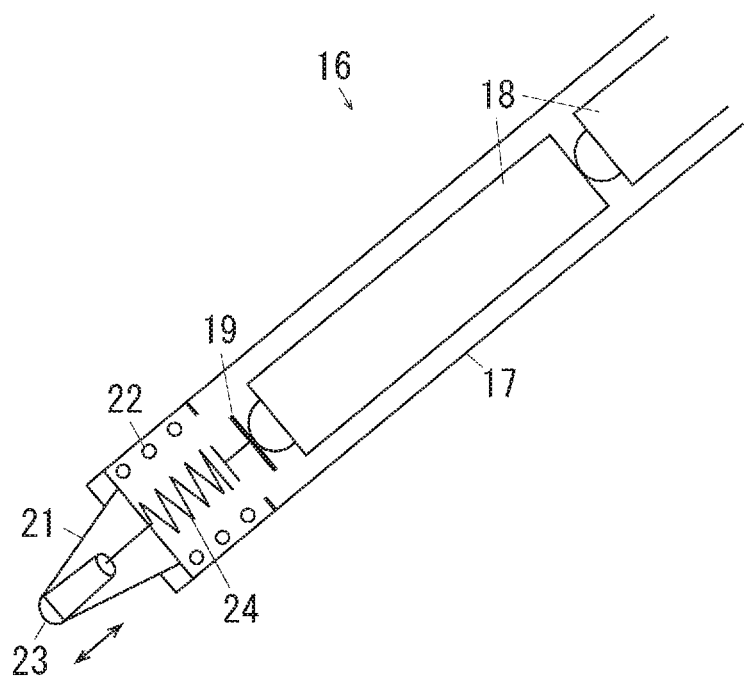
FIG. 3 illustrates major portions of an input member according to the exemplary embodiment.

FIG. 3 illustrates major portions of an input member according to the exemplary embodiment.

Referring to FIG. 1, the content display system 1 according to the exemplary embodiment includes a stylus 16, which is an example of an input member. Referring to FIGS. 1 and 3, the stylus 16 according to the exemplary embodiment has a shape of a writing tool so that the user 3 is able to operate the stylus 16 by holding it with their hand. Referring to FIG. 3, the stylus 16 according to the exemplary embodiment includes a body portion 17 that is a hollow cylinder. The body portion 17 contains therein dry batteries 18, which are an example of a power supply. A terminal member 19 that is in contact with the terminal of one of the dry batteries 18 is disposed at a position near an end of the body portion 17.

A slider 21, which is an example of a pressure-sensitive portion, is supported at the end of the body portion 17 so as to be movable in an axis direction of the hollow cylinder. A spring 22, which is an example of a bias member, is supported between the slider 21 and the body portion 17. The spring 22 applies a force for pressing the slider 21 toward the end.

A light-emitting diode (LED) light source 23, which is an example of a light-emitting portion, is supported at a tip of the slider 21. A connection terminal 24 that extends toward the terminal member 19 is connected to the LED light source 23. Thus, when the tip of the slider 21 touches a sheet medium (sheet bundle S), such as paper or overhead projector (OHP) films, the spring 22 contracts, causing the connection terminal 24 to come into contact with the terminal member 19 in the stylus 16 according to the exemplary embodiment. Accordingly, the dry batteries 18 are connected to the LED light source 23 and feed power to the LED light source 23. Consequently, the LED light source 23 emits light. Although the dry batteries 18 are used as an example of the power supply in the exemplary embodiment, the power supply is not limited to the dry batteries 18. For example, a rechargeable battery may be used, or power may be fed from an outlet via a cable.

In addition, referring back to FIG. 1, the sheet bundle S, which is an example of sheet media according to the exemplary embodiment, includes plural sheets. The sheet bundle S has a hole 31 formed by punching, at one of the corners thereof. A clip 32 having a shape of a ring is attached through the hole 31. The clip 32, thus, enables sheets of the sheet bundle S according to the exemplary embodiment to be turned over.

Description of Controller in Exemplary Embodiment

Figure 4:
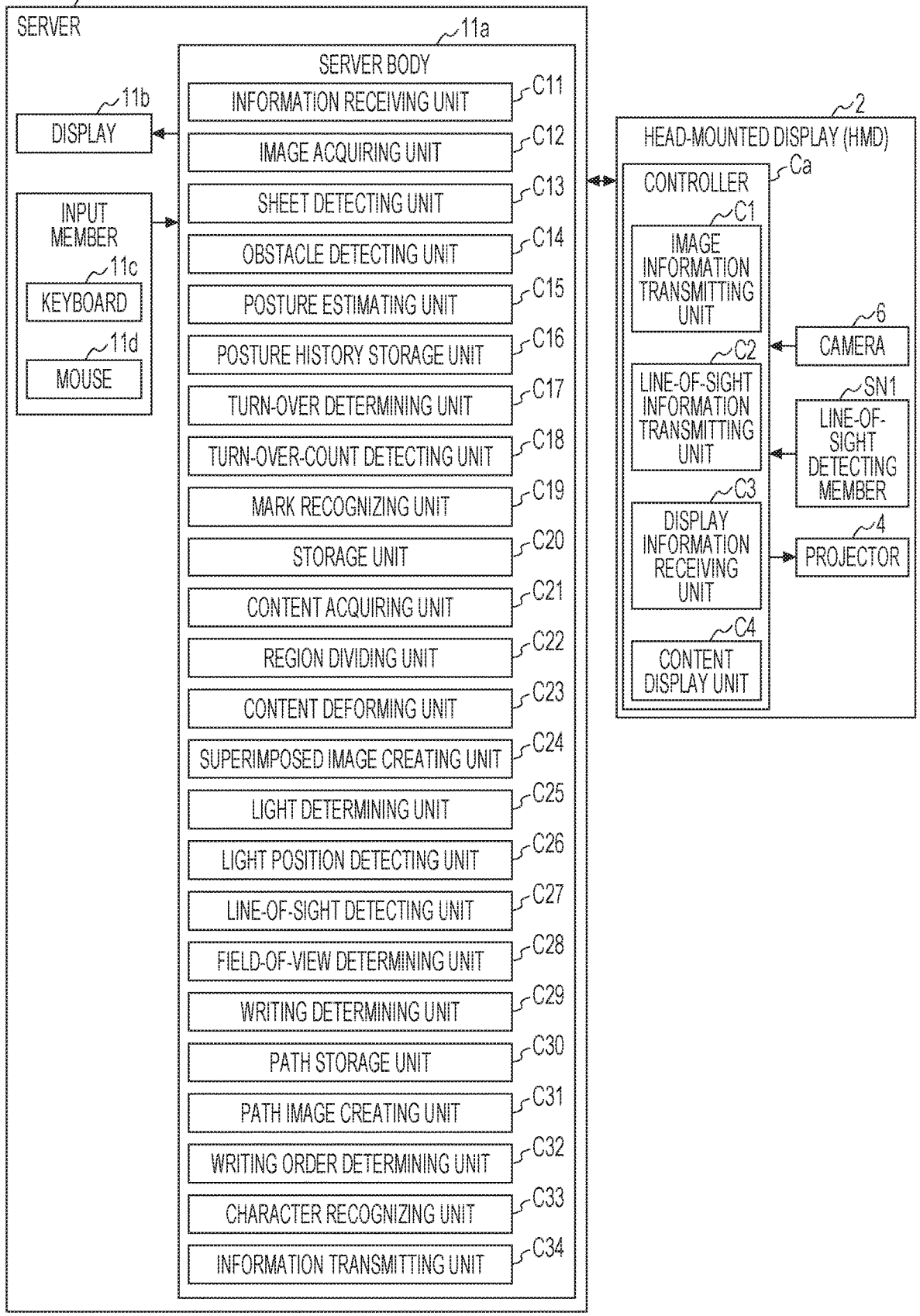
FIG. 4 is a block diagram illustrating functions of each of the members of the content display system according to the exemplary embodiment.

FIG. 4 is a block diagram illustrating functional units of each of the members of the content display system 1 according to the exemplary embodiment.

Referring to FIG. 4, a controller Ca of the head-mounted display 2 and the server body (controller) 11a each have an input/output interface I/O used to receive and output a signal from and to the outside. In addition, the controller Ca and the server body 11a each include a read only memory (ROM) that stores a program and information used to perform a necessary process, a random access memory (RAM) that temporarily stores necessary data, and a central processing unit (CPU) that performs a process in accordance with a program stored in the ROM or the like. Accordingly, the controller Ca according to the exemplary embodiment is constituted by a small information processing apparatus, namely, a micro-computer. Likewise, the server body 11a is constituted by an information processing apparatus, namely, a computer. Therefore, the controller Ca and the server body 11a each are capable of implementing various functions by executing a program stored in the ROM or the like.

Signal Output Components Connected to Controller Ca of Head-Mounted Display 2

Output signals from signal output components, such as the camera 6, a line-of-sight detecting member SN1, and a sensor (not illustrated), are input to the controller Ca of the head-mounted display 2.

The camera 6 captures an image of scenery ahead of the head-mounted display 2.

The line-of-sight detecting member SN1 captures a video image of eyes of the user 3.

Control-Target Components Connected to Controller Ca of Head-Mounted Display 2

The controller Ca of the head-mounted display 2 is connected to the projector 4 and other control-target components (not illustrated). The controller Ca outputs control signals to the projector 4 and the other control-target components.

The projector 4 displays (projects) an image on (onto) the glass portion 2b.

Functional Units of Controller Ca of Head-Mounted Display 2

The controller Ca of the head-mounted display 2 has a function of performing a process in accordance with an input signal received from each of the signal output components and then outputting a control signal to a corresponding one of the control-target components. That is, the controller Ca has the following functional units ((1) to (4)).

(1) Image Information Transmitting Unit C1

An image information transmitting unit C1 transmits data of an image captured by the camera 6 to the server 11.

(2) Line-of-Sight Information Transmitting Unit C2

A line-of-sight information transmitting unit C2 transmits data of a video image of eyes captured by the line-of-sight detecting member SN1 to the server 11.

(3) Display Information Receiving Unit C3

A display information receiving unit C3 receives information that is transmitted from the server 11 and that is displayed on the glass portion 2b.

(4) Content Display Unit C4

A content display unit C4 controls the projector 4 on the basis of the information received by the display information receiving unit C3 to display an image on the glass portion 2b.

Signal Output Components Connected to Server Body 11a

Output signals from signal output components, such as the keyboard 11c, the mouse 11d, and a sensor (not illustrated), are input to the server body 11a.

Control-Target Components Connected to Server Body 11

The server body 11a is connected to the display 11b and other control-target components (not illustrated). The server body 11a outputs control signals to the display 11b and the other control-target components.

Functional Units of Server Body 11a

The server body 11a has a function of performing a process in accordance with an input signal received from one of the signal output components and then outputting a control signal to a corresponding one of the control-target components. That is, the server body 11a has the following functional units ((1) to (24)).

(1) Information Receiving Unit C11

An information receiving unit C11 receives information transmitted from the head-mounted display 2. In the exemplary embodiment, the information receiving unit C11 receives data of an image captured by the camera 6 and data of a video image captured by the line-of-sight detecting member SN1.

(2) Image Acquiring Unit C12

An image acquiring unit C12 acquires the image captured by the camera 6. Thus, the image acquiring unit C12 acquires an image containing the sheet bundle S and the stylus 16, for example. The image acquiring unit C12 according to the exemplary embodiment acquires an image at an interval set in advance. The interval at which the image is acquired is settable in accordance with processing time of each of various processes (described later). A shorter interval is more preferable because the images are more likely to be recognized as a smooth video image by the user 3.

(3) Sheet Detecting Unit C13

A sheet detecting unit C13 detects the sheet bundle S (sheet media) on the basis of the image acquired by the image acquisition unit C12. The sheet detecting unit C13 according to the exemplary embodiment analyzes an image captured by the camera 6 to determine whether a sheet-like object having four corners is present in the image. In this way, the sheet detecting unit C13 detects the sheet bundle S. Note that the sheet detecting unit C13 detects the sheet bundle S by performing image analysis even in the cases where the sheet bundle S is bent or curved, part of the sheet bundle S, such as a corner, is folded, and part of the sheet bundle S is hidden by an object such as a hand or the stylus 16.

(4) Obstacle Detecting Unit C14

An obstacle detecting unit C14 detects an obstacle such as a hand of the user 3 or the stylus 16 that hides part of the sheet bundle S, on the basis of the image acquired by the image acquiring unit C12. The obstacle detecting unit C14 according to the exemplary embodiment performs image analysis to detect an obstacle.

(5) Posture Estimating Unit C15

A posture estimating unit C15 estimates a posture of the sheet bundle S on the basis of the detection results obtained by the sheet detecting unit C13 and the obstacle detecting unit C14. The posture estimating unit C15 according to the exemplary embodiment estimates a posture of the sheet bundle S, such as the three-dimensional position, tilt, bending, curve, folding, etc.

(6) Posture History Storage Unit C16

A posture history storage unit C16 stores a history of the posture of the sheet bundle S estimated by the posture estimating unit C15.

Figure 5A:
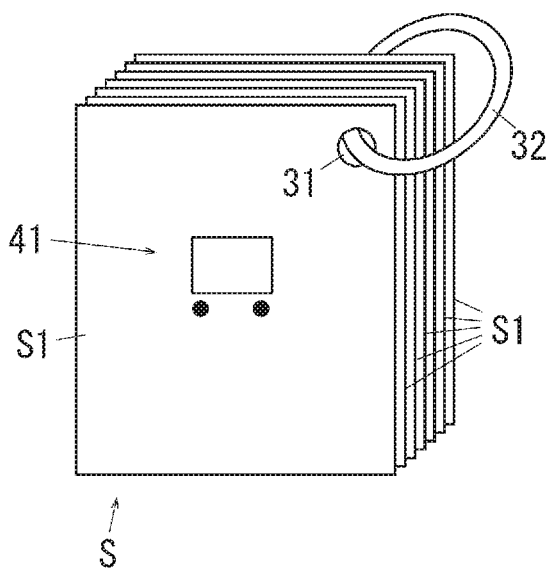
FIGS. 5A to 5C illustrate a state where a sheet of a sheet bundle is turned over, specifically.
Figure 5B:
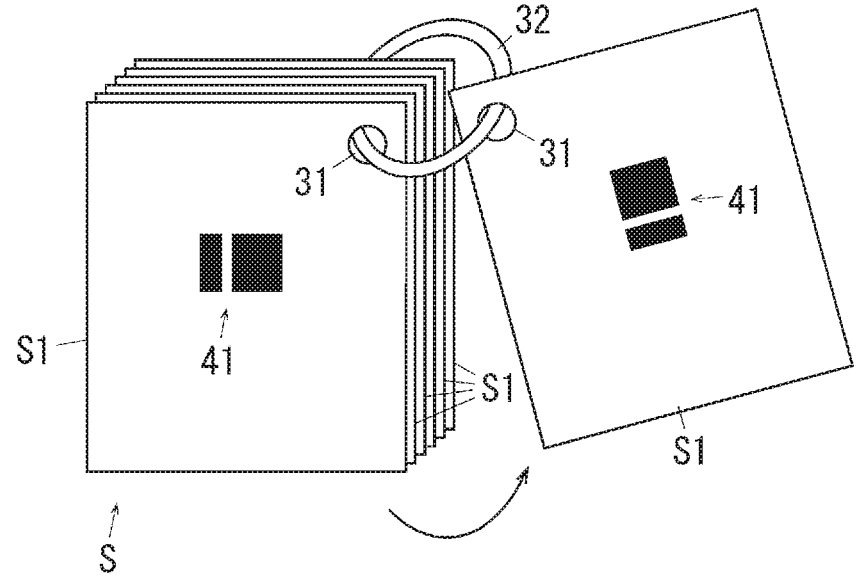
Figure 5C:
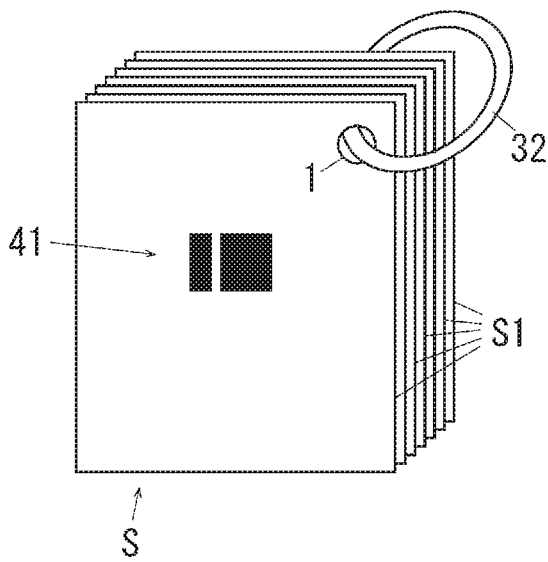

FIGS. 5A to 5C illustrate a state where a sheet S1 of the sheet bundle S is turned over. Specifically, FIG. 5A illustrates a state before the sheet S1 is turned over, FIG. 5B illustrates a state where the sheet S1 is being turned over, and FIG. 5C illustrates a state after the sheet S1 has been turned over.

(7) Turn-Over Determining Unit C17

A turn-over determining unit C17 determines whether the sheet S1 that constitutes the sheet bundle S is turned over on the basis of the history of the posture of the sheet bundle S stored in the posture history storage unit C16. For example, the turn-over determining unit C17 according to the exemplary embodiment determines that the sheet S1 is turned over when a series of posture change in which the sheet S1 moves along the clip 32 is detected as illustrated in FIGS. 5A to 5C.

(8) Turn-Over-Count Detecting Unit C18

A turn-over-count detecting unit C18 counts the number of times the sheets S1 are turned over (hereinafter, referred to as a turn-over count), that is, the number of sheets S1 that are turned over.

FIGS. 6A to 6C illustrate how content is superimposed in accordance with the exemplary embodiment. Specifically, FIG. 6A illustrates a sheet having an identification mark thereon, FIG. 6B illustrates content data associated with the identification mark illustrated in FIG. 6A, and FIG. 6C illustrates a state where the content data is superimposed on the sheet S1.

(9) Mark Recognizing Unit C19

On the basis of the image acquired by the image acquiring unit C12, a mark recognizing unit C19, which is an example of an identification information recognizing unit, recognizes an identification mark 41, which is an example of identification information assigned to each sheet S1 of the sheet bundle S. As the identification mark 41, a dedicated marker may be used or any given marker of the related art, such as a barcode or a two-dimensional code such as a quick response (QR) code (registered trademark) or an augmented reality (AR) marker may be used. In addition, in the case where particular information, such as the company name, the document creator's name, the page number, or the company logo, is at a specific position of each page of a document such as a presentation material, for example, a specific character string such as the company name or the company logo may be used as information for identifying the content, instead of using the marker.

(10) Storage Unit C20

A storage unit C20 stores content information 42 corresponding to the identification mark 41. The storage unit C20 according to the exemplary embodiment stores the identification mark 41 and the content information 42 corresponding to the identification mark 42 in association with each other. Multiple pieces of content information 42 are sometimes associated with a single identification mark 41. For example, when the sheet bundle S is constituted by five sheets S1, content of page 1, content of page 6, content of page 11, content of page 16, and so on may be associated with the identification mark 41 on the sheet S1 of page 1; and content of page 2, content of page 7, content of page 12, content of page 17 and so on may be associated with the identification mark 41 on the sheet S1 of page 2.

(11) Content Acquiring Unit C21

A content acquiring unit C21 acquires the content information 42 corresponding to the identification mark 41 recognized by the mark recognizing unit C19. The content acquiring unit C21 according to the exemplary embodiment acquires the corresponding content information 42 on the basis of the identification mark 41 and the turn-over count. For example, when the identification mark 41 on the sheet S1 of page 2 is recognized in a state where the turn-over count is equal to 6 (greater than or equal to 5 and less than 10), the content acquiring unit C21 acquires the content information 42 of page 7. Note that in the case where multiple identification marks 41 are recognized in the acquired image, the content acquiring unit C21 according to the exemplary embodiment acquires the content information 42 corresponding to each of the identification marks 41.

Figure 7A:
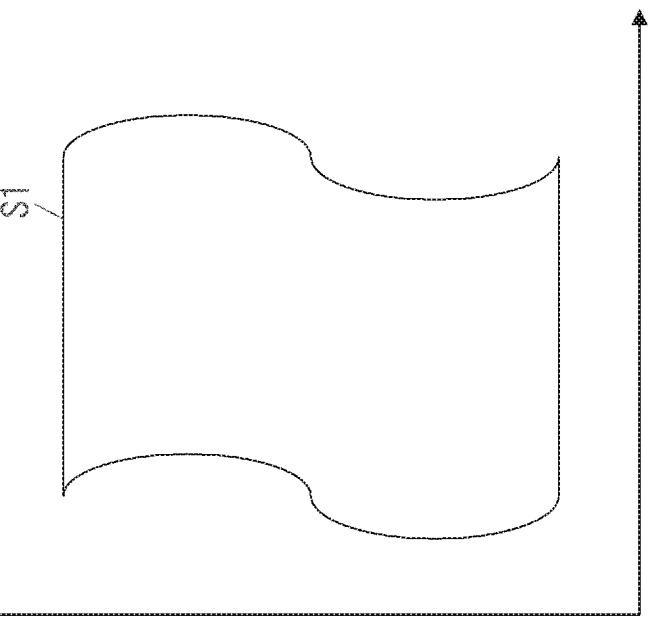
FIGS. 7A and 7B illustrate how a region of a curved sheet is divided into sub-regions in accordance with the exemplary embodiment, specifically.
Figure 7B:
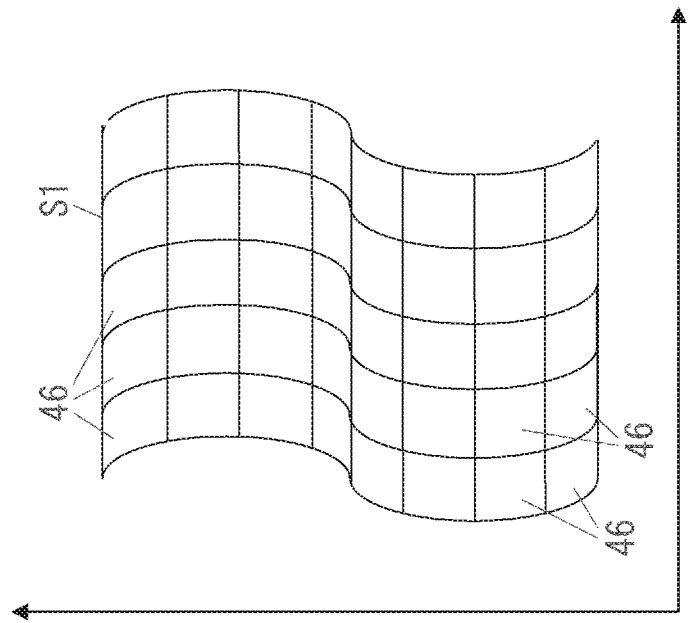

FIGS. 7A and 7B illustrate how a region of a curved sheet is divided into sub-regions in accordance with the exemplary embodiment. Specifically, FIG. 7A illustrates a state before the division, and FIG. 7B illustrates a state after the division.

(12) Region Dividing Unit C22

A region dividing unit C22 divides a region of the sheet S1 into multiple sub-regions 46 in accordance with the posture of the sheet S1 estimated by the posture estimating unit C15. Referring to FIGS. 7A and 7B, the region dividing unit C22 according to the exemplary embodiment divides the region of the sheet S1 into the sub-regions 46 each having a shape of a quadrangle that has four sides parallel to respective outer edges of the sheet S1. Therefore, when the sheet S1 is bent or curved as illustrated in FIGS. 7A and 7B, the sub-regions 46 also have four curved sides.

Parts (A) and (B) of FIG. 8 illustrate how the content is deformed in accordance with the exemplary embodiment. Specifically, part (A) of FIG. 8 illustrates a state before the deformation, and part (B) of FIG. 8 illustrates a state after the deformation.

(13) Content Deforming Unit C23

A content deforming unit C23 deforms content on the basis of the content information 42 acquired by the content acquiring unit C21 and the shape of the sub-regions 46 obtained by the region dividing unit C22 through division. The content deforming unit C23 according to the exemplary embodiment divides the content information 42 into divisional regions in accordance with the number of sub-regions 46, for example, 5 columns×8 rows in FIGS. 7A and 7B. Then, the content deforming unit C23 acquires the coordinates of the four corners of each of the sub-regions 46 and deforms (enlarges, reduces, translates, rotates, shears) the content information 42 of an image of the corresponding divisional region by projective transformation H in accordance with an amount of change of the acquired coordinates relative to the coordinates of four corners of the divisional region of the content information 42 corresponding to the sub-region 46.

(14) Superimposed Image Creating Unit C24

A superimposed image creating unit C24 creates an image of content to be superimposed on the sheet S1. The superimposed image creating unit C24 according to the exemplary embodiment combines content images for the respective sub-regions 46 deformed by the content deforming unit C23 together to create an image of content to be displayed on the head-mounted display 2 so as to be superimposed on the sheet S1.

(15) Light Determining Unit (Contact Detecting Unit)

A light determining unit C25 determines light emitted from the LED light source 23 of the stylus 16 on the basis of the image acquired by the image acquiring unit C12. Specifically, the light determining unit C23 detects emission of light in response to the tip of the stylus 16 coming into contact with the sheet S1. For example, when brightness in the image is greater than a value set in advance, the light determining unit C25 according to the exemplary embodiment identifies light from the stylus 16. Note that a method for identifying the light emitted from the LED light source 23 is not limited to this one. For example, if light emitted from the LED light source 23 has a specific color, the light may be determined based on the color. For example, when the sheet bundle S is white and the light is red, light may be determined by determining whether the region of the sheet S1 includes a red spot. In addition, in order to increase the light detection accuracy, physical properties of light may be utilized, such as in the cases where a sharp rise in brightness is regarded as a trigger for starting writing and it is determined whether detected color is light by using a property, such as the intensity, diffusion, or frequency of the light.

FIG. 9 illustrates an example of a position identification method used in the case where the position is hidden by an obstacle.

(16) Light Position Detecting Unit C26

A light position detecting unit C26 identifies the position illuminated with light determined by the light determining unit C25. The light position detecting unit C26 according to the exemplary embodiment identifies the position illuminated with light emitted from the LED light source 23. When part of the sheet S1 is hidden by a hand or an arm or by folding, the light position detecting unit C26 estimates the position of the sheet illuminated with light by extending a light path 48 stored in a path storage unit (described later). For example, in FIG. 9, features of the image of the content information 42 in the individual sub-regions 46 and an amount of movement per time may be stored, the sub-region 46 hidden by an obstacle 47 or the posture of the sheet S1 may be identified from the features of the image of the content information 42, and the position currently illuminated with the light may be estimated from the position of the sub-region 46 illuminated with light in the past by using a prediction algorithm such as a Kalman filter. At that time, filtering becomes easy and highly accurate if a restriction is applied so that the estimated position is continuous to the adjacent region of the sub-region 46.

FIG. 10 illustrates a line of sight and a field of view in accordance with the exemplary embodiment.

(17) Line-of-Sight Detecting Unit C27

A line-of-sight detecting unit C27 detects the line of sight of the user 3 on the basis of the detection result obtained by the line-of-sight detecting member SN1. In FIG. 10, the line-of-sight detecting unit C27 according to the exemplary embodiment detects a direction (line of sight) 51 of an eye 3a of the user 3 from the detection result obtained by the line-of-sight detecting member SN1.

(18) Field-of-View Determining Unit C28

A field-of-view determining unit C28 determines a field of view 52 of the user 3 on the basis of the line of sight (the direction) 51. The field-of-view determining unit C28 according to the exemplary embodiment computes, as the field of view 52, a cone-shaped region centered at the line of sight (the direction) 51 and having a radius that increases in proportion to the distance from the user 3.

(19) Writing Determining Unit C29

A writing determining unit C29 determines whether writing is performed on the basis of the field of view 52 and the position illuminated with light detected by the light position detecting unit C26. The writing determining unit C29 according to the exemplary embodiment determines whether writing is performed by determining whether light emitted from the LED light source 23 is detected in the field of view 52 in the image captured by the camera 6. That is, the writing determining unit C29 performs the determination so as not to erroneously determine writing in the case where light is emitted as a result of the stylus 16 coming into contact with the sheet S1 when the user 3 is not watching the sheet S1.

FIGS. 11A and 11B illustrate an example in which writing is performed on a content image. Specifically, FIG. 11A illustrates the sheet S1 and the light path 48, and FIG. 11B illustrates data to be displayed and stored.

(20) Path Storing Unit C30 (Storing Unit)

A path storage unit C30 stores the light path 48 of light emitted from the LED light source 23 of the stylus 16. In FIGS. 11A and 11B, when storing the light path 48, the path storage unit C30 according to the exemplary embodiment stores the light path 48 in association with the image of the content information 42 on which the light path 48 is written. Specifically, at which position of which content the writing is performed is stored in association with the light path 48. In addition, the path storage unit C30 according to the exemplary embodiment stores, as writing, the light path 48 that is determined by the writing determined unit C29 to be writing performed by the user 3. Note that when the light path 48 is stored in association with the image of the content information 42, an image in which the light path 48 is superimposed on the image of the content information 42 may be stored or the image of the content information 42 and the light path 48 may be stored as separate files. In addition, multi-layer data may be used as a storage data format, and the image of the content information 42 and the light path 48 may be stored at different layers in the same file.

(21) Path Image Creating Unit C31

A path image creating unit C31 creates an image of the light path 48 to be displayed on the head-mounted display 2 on the basis of the light path 48 stored in the path storage unit C30. Note that the image of the light path 48 is displayed on the head-mounted display 2 to be superimposed on the image of the content information 42.

(22) Writing Order Determining Unit C32

A writing order determining unit C32 determines the writing order of the written content on the basis of the light path 48. The writing order determining unit C32 according to the exemplary embodiment determines the writing order on the basis of a chronological history.

(23) Character Recognizing Unit C33

A character recognizing unit C33 recognizes a written character on the basis of the light path 48. For characters recognized using an optical character recognition (OCR) technique according to the related art, written characters are recognized and identified on the basis of the writing order determined by the writing order determining unit C32 and the writing order of the characters during the character recognition.

(24) Information Transmitting Unit C34

An information transmitting unit C34 transmits data of the content image created by the superimposed image creating unit C24 and data of the image of the light path 48 created by the path image creating unit C31 to the head-mounted display 2.

Description of Flowchart of Exemplary Embodiment

The flow of control performed in the content display system 1 according to the exemplary embodiment will be described next with reference to a flowchart.

Description of Flowchart

FIG. 12 is a flowchart of a display image creation process according to the exemplary embodiment.

Processing of each step ST of the flowchart illustrated in FIG. 12 is performed in accordance with a program stored in the server 11. In addition, this processing is performed in parallel with various other kinds of processing of the server 11. The head-mounted display 2 performs a process of transmitting, to the server 11, the detection results obtained by the camera 6 and the line-of-sight detecting member SN1 and performs a process of displaying an image based on the data received from the server 11. However, since these processes are simple, illustrations and a detailed description thereof are omitted.

The flowchart illustrated in FIG. 12 starts in response to power-on of the server 11.

In step ST1 of FIG. 12, it is determined whether information is received from the head-mounted display 2. If YES (Y in step ST1), the process proceeds to step ST2; if NO (N in step ST1), step ST1 is repeated.

In step ST2, (1) processing of detecting the sheet S1 and (2) processing of detecting an obstacle on the sheet S1 are performed. The process then proceeds to step ST3.

In step ST3, the posture of the sheet S1 is estimated. The process then proceeds to step ST4.

In step ST4, it is determined whether the sheet S1 is turned over on the basis of the history of the posture. The process then proceeds to step ST5.

In step ST5, the content information 42 is acquired in accordance with the identification mark 41 on the sheet S1 and the turn-over count. The process then proceeds to step ST6.

In step ST6, division is performed on the basis of the acquired image to obtain the sub-regions 46. The process then proceeds to step ST7.

In step ST7, an image of the content is deformed in accordance with the shape of the sub-regions 46. The process then proceeds to step ST8.

In step ST8, the image of the content information 42 according to the posture of the sheet S1 is created from the deformed images of the sub-regions 46. The process then proceeds to step ST9.

In step ST9, it is determined whether light emitted from the stylus 16 is detected in the image captured by the camera 6. If YES (Y in step ST9), the process proceeds to step ST10; if NO (N in step ST9), the process proceeds to step ST11.

In step ST10, the position illuminated with light is detected. The process then proceeds to step ST13.

In step ST11, the position illuminated with the light is estimated from the light path 48. The process then proceeds to step ST12.

In step ST12, it is determined whether the estimated position illuminated with the light matches the position of the obstacle. If YES (Y in step ST12), the process proceeds to step ST13; if NO (N in step ST12), the process proceeds to step ST17.

In step ST13, the line of sight 51 is acquired. The process then proceeds to step ST14.

In step ST14, it is determined whether the position illuminated with the light is in the field of view 52. If YES (Y in step ST14), the process proceeds to step ST15; if NO (N in step ST14), the process proceeds to step ST17.

In step ST15, (1) processing of storing the light path 48 and (2) processing of creating an image of the light path 48 are performed. The process then proceeds to step ST16.

In step ST16, (1) processing of determining the writing order on the basis of the light path 48, (2) processing of performing character recognition on the basis of the writing order, and (3) processing of storing the character recognition result are performed. The process then proceeds to step ST17.

In step ST17, data of the created content image and data of the image of the light path 48 are transmitted to the head-mounted display 2. The process then returns to step ST1.

Operations of Exemplary Embodiment

In the content display system 1 according to the exemplary embodiment having the above configuration, when the user 3 turns their eyes toward the sheet bundle S after wearing the head-mounted display 2, an image of the sheet bundle S is captured by the camera 6. Then, the posture of the sheet bundle S is determined, and the image of the content information 42 according to the identification mark 41 and the posture of the sheet bundle S is displayed to be superimposed. In addition, when the user 3 performs writing on the sheet bundle S by using the stylus 16, an image according to the light path 48 is displayed to be superimposed. Thus, the user 3 is able to virtually view the content and the written memo displayed using the head-mounted display 2, regardless of the fact that the user 3 is just moving the stylus 16 on the surface of the sheet bundle S having the identification mark 41 thereon.

In the case where tablet terminals described in Japanese Unexamined Patent Application Publication Nos. 2009-26123 and 2015-204035 are used, the surface of such tablet terminals is made of glass or the like and is slippery. Thus, it is more difficult to perform writing on the glass surface than in the case where a sheet is used. In contrast, the user virtually performs writing on the sheet bundle S by using the stylus 16 in the exemplary embodiment. Thus, it is easier to perform writing than in the case where tablet terminals are used. In addition, it becomes easier for the user 3 to have a sense of actually writing something on a sheet and to recognize the virtual writing action as the actual writing action. Thus, the user is more likely to have a sense of reality than in the case where tablet terminals are used.

In addition, the configuration for displaying handwritten information as described in Japanese Unexamined Patent Application Publication No. 2005-267257 has an issue in that it is difficult to associate the handwritten information with the content. Thus, checking the handwritten content later is not enough to understand the content because the relationship between the handwritten content and the content is difficult to understand. In contrast, since the handwritten content (the light path 48) and the content information 42 are stored in association with each other in the exemplary embodiment, it becomes easier to check and understand the content.

Further, the configuration of using a fixed display device as described in Japanese Unexamined Patent Application Publication No. 2009-26123 has an issue in that viewing and inputting by handwriting are not performed easily at any place. In addition, the use of tablet terminals involves an issue in that the tablet terminals are more difficult to handle than sheet media, such as paper, because of the weight of the battery and are less convenient.

In contrast, in the exemplary embodiment, the content image is displayed to be superimposed on the sheet bundle S. Thus, the user 3 handles the sheet bundle S, which is more portable and easier to handle than tablet terminals. In addition, since the content, such as a document, a drawing, or a table, is projected onto the sheet bundle S, it is easy to view the content.

In particular, the sheet bundle S may be curved. Thus, handling becomes easier for the user 3 than in the case of using tablet terminals that are not curved or bent. In addition, in the exemplary embodiment, even if the sheet bundle S is curved, the content is deformed in accordance with the posture of the sheet bundle S and the deformed content is displayed. Thus, the user 3 is able to view the content without feeling something is strange, compared with the case where the content is not deformed.

In addition, in the exemplary embodiment, writing is virtually performed by using the stylus 16, that is, nothing is written on the sheet bundle S. If something is written on the sheet bundle S, it is difficult to reuse the sheet bundle S. However, since writing is not actually performed in the exemplary embodiment, the sheet bundle S is reusable again and again.

Thus, in the exemplary embodiment, the sheet bundle S functions as an input unit with which the user 3 performs input by handwriting and also functions as an output unit on which an image is displayed. That is, the sheet bundle S is used as an interface.

Further, in the exemplary embodiment, the LED light source 23 emits light when a pressure for pressing the slider 21, that is, handwriting pressure, is applied after the stylus 16 comes into contact with the sheet bundle S. Thus, writing is detected when the user 3 operates the stylus 16 with an intention for writing. Therefore, erroneous detection of writing is reduced compared with the configuration in which the LED light source 23 emits light regardless of the writing pressure.

In addition, when it is determined whether writing is performed using the stylus 16, the determination is made by taking the line of sight 51 into account. Thus, erroneous determination of writing is reduced compared with the case where the line of sight 51 is not used.

Further, in the exemplary embodiment, writing is determined on the basis of light from the stylus 16. However, when it is difficult to estimate the position illuminated with the light because of a hand or an arm, it is possible to presume the position illuminated with light from the history of the light path 48. Thus, even if tracking of the position illuminated with the light temporarily fails because the light intensity temporarily becomes insufficient or the position is not observed temporarily due to hiding of the position by a hand or an arm or because the position illuminated with light temporarily moves discontinuously when the light passes a bent portion, the position of the tip of the stylus 16 is successfully estimated from the past history (light path 48). Thus, the writing determination accuracy increases compared with the case where the position illuminated with the light is not estimated from the history of the light path 48.

In addition, in the exemplary embodiment, it is determined whether the sheet S1 is turned over on the basis of the posture of the sheet S1. In addition, in accordance with the number of times the sheet S is turned over, content to be displayed on the sheet S1 is acquired. Thus, in the exemplary embodiment, even if the number of sheets S1 that constitute the sheet bundle S is less than the total number of pages of the content, the user 3 is able to view all the pages by turning over the sheets S. That is, the number of sheets S1 that constitute the sheet bundle S may be reduced compared with the case where the number of sheets S are prepared in accordance with the number of pages of the content, and the weight of the sheet bundle S is reduced. As a result, it becomes easier to handle the sheet bundle S, and the cost for paper may also be reduced.

Further, in the exemplary embodiment, character recognition is performed on the basis of the light path 48. Thus, it becomes easier to convert the written content into characters or a document. As a result, the characters input by the user 3 by handwriting are easily reusable without re-inputting them using a keyboard or the like.

In addition, in the exemplary embodiment, character recognition is performed by taking the writing order into account. Thus, the character recognition accuracy increases compared with the case where the writing order is not taken into account.

FIGS. 13A and 13B illustrate a state where plural sheets S1 are arranged. Specifically, FIG. 13A illustrates a state before rearrangement, and FIG. 13B illustrates a state after rearrangement.

Further, in the exemplary embodiment, when the identification marks 41 are detected in an image captured by the camera 6, content is display for all the detected identification marks 41. Thus, content of multiple pages may be displayed and viewed as illustrated in FIGS. 13A and 13B. For example, even if the page order is changed, content is displayed on the basis of the identification marks 41 and the pages are displayed in the resultant order in the exemplary embodiment. The content information 42 may be updated when rearrangement is performed, so that the page order after the rearrangement is stored.

In addition, in the exemplary embodiment, a meeting material is usable as content. In this case, a sheet bundle is distributed to participants of the meeting, and common content is projected onto the sheet bundle. In this way, the meeting is carried out. A memo written by each participant is then stored in association with the content. Thus, each participant is able to check their memo after the meeting is finished. In addition, the memos of all the participants may be integrated together to create the minutes of the meeting. Further, a portion with many memos and a portion with a few memos or a portion where the line of sight is concentrated or a portion where the line of sight is not concentrated may be analyzed from the memos or line-of-sight histories of all the participants. This analysis may be utilized in analysis of a part which the participants are interested in or a part of the material that is difficult to understand.

In addition, in the case where classes of different subjects are given, the subjects may be switched between by changing the content associated with the identification marks 41. Thus, classes of plural different subjects may be given using a single textbook (sheet bundle S).

Further, the sheet bundle S assigned the identification marks 41 may be distributed as examination questions, and the questions (content) may be viewed using the head-mounted display 2. That is, the sheet bundle S does not have questions thereon. Thus, even if examinees bring back the sheet bundle S, the examinees are not able to view the questions. Consequently, leakage of the examination questions is successfully prevented.

Modifications

While the exemplary embodiment of the present invention has been described in detail above, the present invention is not limited to the exemplary embodiment and various modifications may be made within the scope of the essence of the present invention described in the claims. Modifications (H01) to (H07) of the present invention will be described as examples.

(H01) In the exemplary embodiment, a configuration of the stylus 16 in which the slider 21 moves in response to application of a writing pressure, causing the LED light source 23 to emit light has been described as an example. However, the configuration of the stylus 16 is not limited to this one. For example, a contact detector, such as a pressure-sensitive sensor or a pressure-sensitive switch, may be provided at the tip of the stylus 16 to allow the LED light source 23 to emit light in response to application of a pressure to the tip of the stylus 16. In addition, although it is desirable that pressure sensing and light emission of the LED light source 23 operate in conjunction with each other, they may operate not in conjunction with each other. That is, the stylus 16 may be capable of transmitting and receiving information to and from the server 11. Upon sensing a pressure, the stylus 16 transmits information indicating so to the server 11. In this way, writing is determined, and the LED light source 23 keeps emitting light. Further, the method for determining the writing is not limited to pressure sensing. For example, a switch may be provided in the body portion 17, and the switch may be turned on when the user holds the stylus 16 to cause the LED light source 23 to emit light or to cause information to be transmitted to the server 11.

(H02) In the exemplary embodiment, the light source of the stylus 16 is not limited to an LED. Any given light-emitting component, such as a lamp or a laser, may be employed.

(H03) In the exemplary embodiment, the number of times the sheet S1 is turned over is desirably counted. However, a configuration that does not support turning over of sheets may be employed.

(H04) In the exemplary embodiment, the posture of the sheet S1 is desirably detected and content is desirably deformed in accordance with the posture. However, a configuration in which the content is not deformed may be employed.

(H05) In the exemplary embodiment, determination is desirably made by taking the line of sight 51 into account when writing is detected. However, the line of sight 51 may not be taken into account.

(H06) In the exemplary embodiment, the character recognition process is desirably performed. However, the character recognition process may be omitted. In addition, the writing order is desirably determined. However, determination of the writing order may be omitted.

(H07) In the exemplary embodiment, the configuration in which the server 11 performs various processes of acquisition of content, estimation of the posture of the sheet medium, deformation of the content, and detection of writing in a centralized manner has been described as an example. However, the configuration is not limited to this one. All the functions may be incorporated into the head-mounted display 2, or some of the processes performed by the server 11 may be performed by the head-mounted display 2. In addition, an information processing apparatus different from the server 11 may be further provided, and distributed processing or cloud-based processing may be performed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A content display apparatus comprising:
at least one processor configured to implement an image acquiring unit that acquires an image of a sheet; and
a memory configured to store content that is not included in the acquired image;
wherein the at least one processor is configured to implement a content display unit that displays the stored content, in accordance with the acquired image, so that the stored content is superimposed on the sheet,
wherein the content display apparatus further comprises a stylus including a light-emitting portion at a tip thereof,
wherein the at least one processor is further configured to implement:
a light determining unit that determines a position illuminated with light emitted from the light-emitting portion, using the acquired image;
a storing unit that stores a path of the light determined while the stylus is in contact with the sheet in association with the content; and
a posture estimating unit that estimates a posture of the sheet, using the acquired image of the sheet, and
wherein the content display unit displays, in response to turning over of the sheet, the turning over being determined using the estimated posture, content corresponding to a following page so as to be superimposed on a top side of the sheet that has been turned over.

2. The content display apparatus according to claim 1, wherein the at least one processor is further configured to implement:
a turn-over-count detecting unit that detects the number of times a plurality of sheet media including the sheet and bound by a ring-shaped clip are turned over,
wherein the content display unit displays content associated with a page according to the number of times so as to be superimposed on a top sheet of the plurality of sheet media.

3. The content display apparatus according to claim 1, wherein in a case where a plurality of sheet media including the sheet are arranged, the content display unit displays content that is associated in advance with each of the plurality of sheet media so as to be superimposed on the sheet.

4. The content display apparatus according to claim 3, wherein in a case where the plurality of sheet media are rearranged, the content display unit displays content that is assigned to each of the plurality of sheet media so as to be superimposed on the sheet in accordance with an order of the plurality of sheet media after the rearrangement.

5. The content display apparatus according to claim 1, wherein the light-emitting portion is configured to emit light while a pressure is sensed.

6. The content display apparatus according to claim 1, wherein the at least one processor is further configured to implement:
a contact detecting unit that detects contact of the stylus with the sheet; and
a writing determining unit that determines writing performed on the sheet by using the stylus, using a contact detection signal output from the contact detecting unit and the position illuminated with the light determined by the light determining unit.

7. The content display apparatus according to claim 1, wherein the at least one processor is further configured to implement:
a line-of-sight detecting unit that detects a line of sight of a user of the stylus; and
a writing determining unit that determines light corresponding to a destination of the line of sight, as writing performed on the sheet by using the stylus.

8. The content display apparatus according to claim 1, wherein the at least one processor is further configured to implement:
a writing order determining unit that determines, using the path of the light, a writing order of writing performed on the sheet by using the stylus; and
a character recognition unit that recognizes a written character from the writing order determined by the writing order determining unit.

9. A non-transitory computer readable storing a program that, if executed, causes a computer to execute a process for displaying content, the process comprising:
acquiring an image of a sheet;
storing, in a memory, content that is not included in the acquired image;
displaying the stored content, in accordance with the acquired image, so that the stored content is superimposed on the sheet medium;
determining a position illuminated with light emitted from a light-emitting portion, using the acquired image, the light-emitting portion being included in a stylus;
storing, a path of the light determined while the stylus is in contact with the sheet in association with the content;
estimating a posture of the sheet, using the acquired image of the sheet, and
displaying, in response to turning over of the sheet, the turning over being determined using the estimated posture, content corresponding to a following page so as to be superimposed on a top side of the sheet that has been turned over.

10. A content display apparatus comprising:
at least one processor configured to implement an image acquiring unit that acquires an image of a sheet; and
a memory configured to store content that is not included in the acquired image;
wherein the at least one processor is configured to implement a content display unit that displays the stored content, in accordance with the acquired image, so that the stored content is superimposed on the sheet,
wherein the content display apparatus further comprises a stylus including a light-emitting portion at a tip thereof,
wherein the at least one processor is further configured to implement:
a light determining unit that determines a position illuminated with light emitted from the light-emitting portion, using the acquired image; and
a storing unit that stores a path of the light determined while the stylus is in contact with the sheet in association with the content,
wherein the acquired image of the sheet comprises an identification mark identifying the sheet, and
wherein the content comprises content of a page corresponding to the identification mark.

11. The content display apparatus according to claim 10, wherein the identification mark comprises at least one of a barcode, a quick response (QR) code, and an augmented reality (AR) marker.

12. The content display apparatus according to claim 1, wherein the content display apparatus further comprises:
a head-mountable display; and
a camera supported by the head-mountable display;

wherein the image acquiring unit acquires the image of the sheet using the camera,
wherein the head-mountable display is configured such that the sheet is visible through a transparent portion of the head-mountable display, and
wherein the content display unit displays the stored content on the head-mountable display.

13. The content display apparatus according to claim 1, wherein the sheet comprises paper.

14. The content display apparatus according to claim 1, wherein the sheet comprises overhead projector film.

* * * * *